(12) United States Patent
Evans et al.

(10) Patent No.: US 8,319,646 B2
(45) Date of Patent: Nov. 27, 2012

(54) METHOD AND APPARATUS FOR TRACKING AND MONITORING CONTAINERS

(75) Inventors: Allan M. Evans, Cupertino, CA (US); Nikola Cargonja, San Carlos, CA (US); Albert Nardelli, Mountain View, CA (US); Timothy K. Brand, Cupertino, CA (US); Reiner G. Mim, Cupertino, CA (US); Robert Zmrzli, San Jose, CA (US)

(73) Assignee: Savi Technology, Inc., Mountain View, CA (US)

( * ) Notice: Subject to any disclaimer, the term of this patent is extended or adjusted under 35 U.S.C. 154(b) by 1052 days.

(21) Appl. No.: 12/236,727

(22) Filed: Sep. 24, 2008

(65) Prior Publication Data

US 2009/0102660 A1 Apr. 23, 2009

Related U.S. Application Data

(60) Provisional application No. 60/974,636, filed on Sep. 24, 2007.

(51) Int. Cl.
*H04Q 5/22* (2006.01)
*G08B 13/14* (2006.01)
*G08B 1/00* (2006.01)

(52) U.S. Cl. ............... 340/572.7; 340/572.1; 340/572.8; 340/539.1; 340/10.1

(58) Field of Classification Search .................. None
See application file for complete search history.

(56) References Cited

U.S. PATENT DOCUMENTS

| | | | |
|---|---|---|---|
| 4,918,432 A * | 4/1990 | Pauley et al. .............. | 340/573.4 |
| 6,882,274 B2 | 4/2005 | Richardson et al. | |
| 6,977,612 B1 | 12/2005 | Bennett | |
| 7,271,725 B2 * | 9/2007 | Sugiyama .................. | 340/572.1 |
| 7,339,469 B2 | 3/2008 | Braun | |
| 7,394,361 B1 | 7/2008 | Twitchell, Jr. | |
| 7,394,381 B2 | 7/2008 | Hanson et al. | |
| 7,414,571 B2 | 8/2008 | Schantz et al. | |

(Continued)

FOREIGN PATENT DOCUMENTS

EP 1 669 916 6/2006

(Continued)

OTHER PUBLICATIONS

PCT Search Report (Forms PCT/ISA/210) and PCT Written Opinion (Form PCT/ISA/237) mailed by the European Patent Office on Apr. 20, 2009 in PCT Application No. PCT/US2008/077449, 15 pages.

(Continued)

*Primary Examiner* — Julie Lieu
(74) *Attorney, Agent, or Firm* — Haynes and Boone, LLP

(57) ABSTRACT

A tag has a circuit portion that functions as a reader capable of wireless communication with other tags. According to a different aspect, a tag has a circuit portion with first and second modes, the circuitry consuming less power in the second mode than the first mode, and exiting the second mode only in response to an act by a human. According to yet another aspect, a tag can receive wireless communications conforming to one of a cellular telephone network communication protocol, a satellite communication protocol, and a wireless computer network communication protocol. The tag responds to receipt of a predetermined wireless signal conforming to the one protocol by carrying out one of first action that includes causing the tag to enter an electronically secure state, or a second action that includes causing the tag to exit the electronically secure state.

19 Claims, 9 Drawing Sheets

U.S. PATENT DOCUMENTS

| | | | |
|---|---|---|---|
| 7,463,155 B2 * | 12/2008 | Narlow et al. | 340/572.7 |
| 7,538,715 B2 | 5/2009 | Langford et al. | |
| 7,609,159 B2 | 10/2009 | Benson et al. | |
| 7,652,576 B1 | 1/2010 | Crossno et al. | |
| 7,659,820 B2 | 2/2010 | Schnee et al. | |
| 7,796,038 B2 * | 9/2010 | Batra | 340/572.1 |
| 7,830,258 B2 | 11/2010 | McAllister | |
| 2002/0036569 A1 * | 3/2002 | Martin | 340/573.1 |
| 2002/0089434 A1 * | 7/2002 | Ghazarian | 340/988 |
| 2004/0233054 A1 | 11/2004 | Neff et al. | |
| 2004/0252053 A1 | 12/2004 | Harvey | |
| 2005/0046567 A1 | 3/2005 | Mortenson et al. | |
| 2006/0007039 A1 | 1/2006 | Duvall | |
| 2006/0109106 A1 | 5/2006 | Braun | |
| 2006/0109109 A1 | 5/2006 | Rajapakse et al. | |
| 2006/0200560 A1 * | 9/2006 | Waugh et al. | 709/224 |
| 2006/0202817 A1 | 9/2006 | Mackenzie et al. | |
| 2006/0226948 A1 * | 10/2006 | Wright et al. | 340/5.25 |
| 2007/0040684 A1 * | 2/2007 | McAllister | 340/572.1 |
| 2007/0247282 A1 | 10/2007 | Olsen et al. | |
| 2007/0285240 A1 | 12/2007 | Sensenig et al. | |
| 2008/0007398 A1 | 1/2008 | DeRose et al. | |
| 2008/0136624 A1 | 6/2008 | Twitchell | |
| 2008/0231449 A1 * | 9/2008 | Moshfeghi | 340/572.1 |
| 2008/0246604 A1 * | 10/2008 | McPherson et al. | 340/539.27 |
| 2009/0102657 A1 | 4/2009 | Evans et al. | |
| 2009/0102658 A1 | 4/2009 | Evans et al. | |
| 2009/0102659 A1 | 4/2009 | Evans et al. | |
| 2009/0102660 A1 | 4/2009 | Evans et al. | |
| 2009/0243924 A1 | 10/2009 | Twitchell et al. | |
| 2010/0090822 A1 * | 4/2010 | Benson et al. | 340/508 |
| 2010/0207754 A1 | 8/2010 | Shostak et al. | |
| 2010/0231381 A1 * | 9/2010 | Twitchell, Jr. | 340/539.13 |
| 2010/0257904 A1 * | 10/2010 | Rickrode | 70/63 |
| 2010/0265068 A1 | 10/2010 | Brackmann et al. | |
| 2011/0037591 A1 | 2/2011 | Easley et al. | |
| 2011/0093287 A1 * | 4/2011 | Dicks et al. | 705/2 |

FOREIGN PATENT DOCUMENTS

| | | |
|---|---|---|
| WO | WO2005/091897 A2 | 10/2005 |
| WO | WO2006/053566 A1 | 5/2006 |
| WO | WO2006/074465 A2 | 7/2006 |

OTHER PUBLICATIONS

PCT International Preliminary Report on Patentability (IPRP, Forms PCT/IB/373 and PCT/ISA/237) issued by the International Bureau on Mar. 24, 2010 in PCT Application No. PCT/US2008/077449, 11 pages.

Office Action mailed Jul. 13, 2011, in related U.S. Appl. No. 12/236,677.

Office Action mailed Aug. 2, 2011, in related U.S. Appl. No. 12/236,700.

Office Action mailed Dec. 30, 2011 in related U.S. Appl. No. 12/236,700.

Office Action mailed Oct. 18, 2011 in related U.S. Appl. No. 12/236,658.

EPO Examination Report mailed Sep. 7, 2010, in related Appl. No. EP 08833005.5.

Office Action mailed Jan. 24, 2011, in related U.S. Appl. No. 12/236,677.

Office Action mailed Mar. 18, 2011, in related U.S. Appl. No. 12/236,658.

Notice of Allowance mailed Mar. 2, 2012, in related Appl. No. 12/236,677.

Notice of Allowance mailed Apr. 2, 2012, in related U.S. Appl. No. 12/236,658.

* cited by examiner

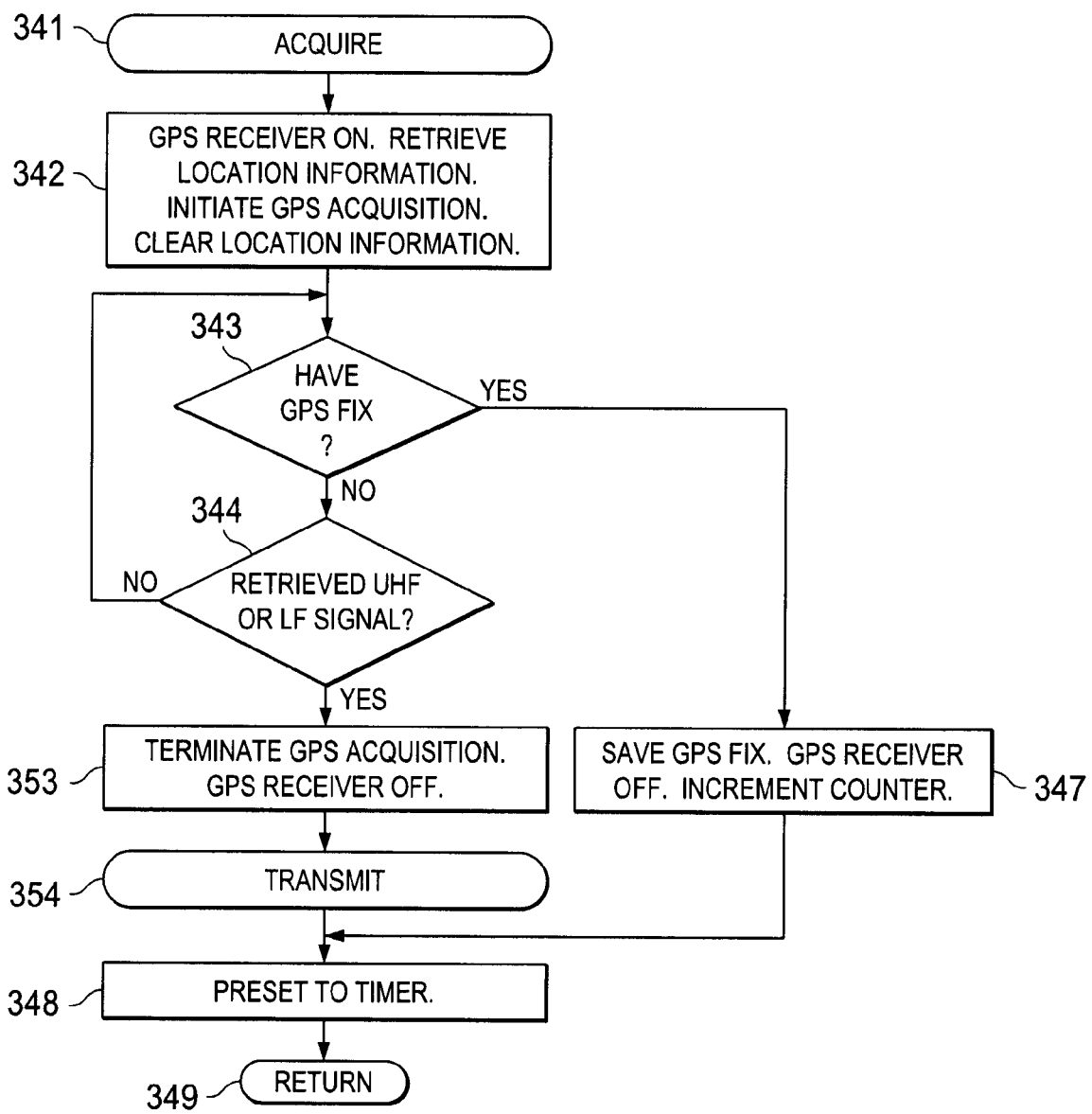

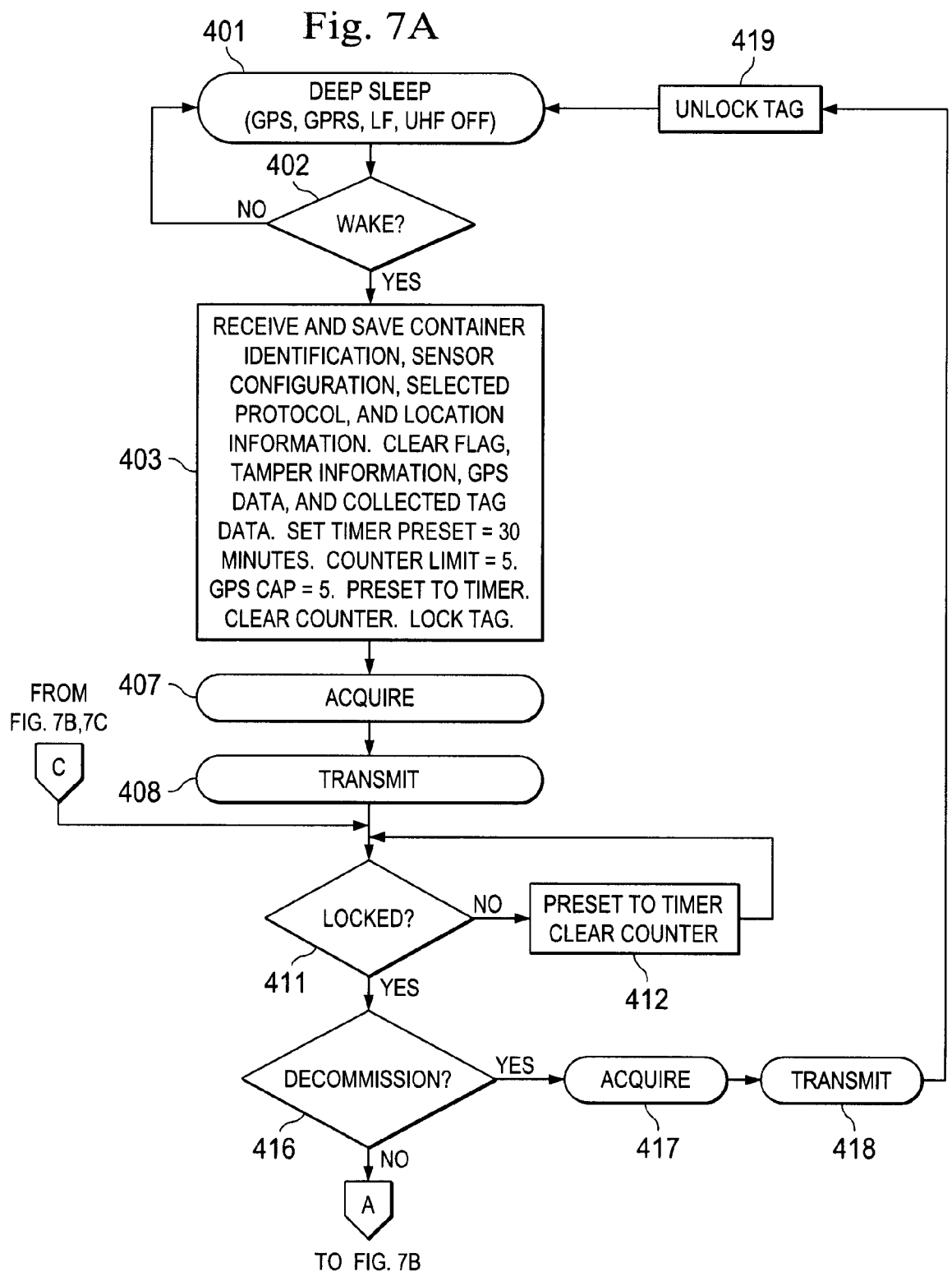

METHOD AND APPARATUS FOR TRACKING AND MONITORING CONTAINERS

This application claims the priority under 35 U.S.C. §119 of provisional application No. 60/974,636 filed Sep. 24, 2007, the disclosure of which is hereby incorporated herein by reference.

FIELD OF THE INVENTION

This invention relates in general to techniques for tracking and monitoring and, more particularly, to techniques for tracking and monitoring shipping containers.

BACKGROUND

A variety of different products are transported in shipping containers. Products are packed into the container by a shipper, and then the container doors are closed and secured with some type of lock. The locked container is then transported to a destination, where a recipient removes the lock and unloads the container.

It is often advantageous to the shipper if some form of monitoring can be carried out while the container is being transported. As one example, the cargo in the container may be relatively valuable products such as computers or other electronic devices, and thieves may attempt to break into the container and steal these products while the container is in transport. As a different example, the cargo in the container may include products such as fresh fruit, for which it is advantageous to continuously monitor temperature, humidity and/or other environmental conditions, in order to avoid or minimize spoilage. Another consideration is that it may be beneficial to the shipper and/or the recipient to be able to accurately track the current location of the container as it travels from the shipper to the recipient.

It is not cost-feasible to have a person watch a container at all times in order to provide security and/or monitoring. Accordingly, electronic systems have previously been developed to provide a degree of automated security and/or monitoring. For example, one existing approach is to attach a radio frequency identification (RFID) tag to a container. The tag then provides monitoring as to both security and environmental conditions, and can send wireless signals that contain status information, including warnings about alarm conditions. Although pre-existing systems of this type have been generally adequate for their intended purposes, they have not been satisfactory in all respects. By way of example and not limitation, one drawback is that, throughout most of the journey of the container, the RFID tag is outside the range of communication with any RFID system, and thus is not able to reliably communicate information to a system or a person at a remote location. In many locations where an RFID system would be useful, no RFID system is installed. Also, even when the tag is within the communication range of an RFID system, that RFID system may be owned or operated by someone other than the shipper or the recipient for the container of interest. Consequently, the tag on the container may be denied any use of that system, or there may be unreasonable costs, delays and/or challenges involved with an attempt by the tag to actually communicate information through that RFID system.

BRIEF DESCRIPTION OF THE DRAWINGS

A better understanding of the present invention will be realized from the detailed description that follows, taken in conjunction with the accompanying drawings, in which:

FIGS. 5, 6 and 7 are flowcharts that show selected aspects of the operation of the tag of FIG. 2.

DETAILED DESCRIPTION

Figure 1:
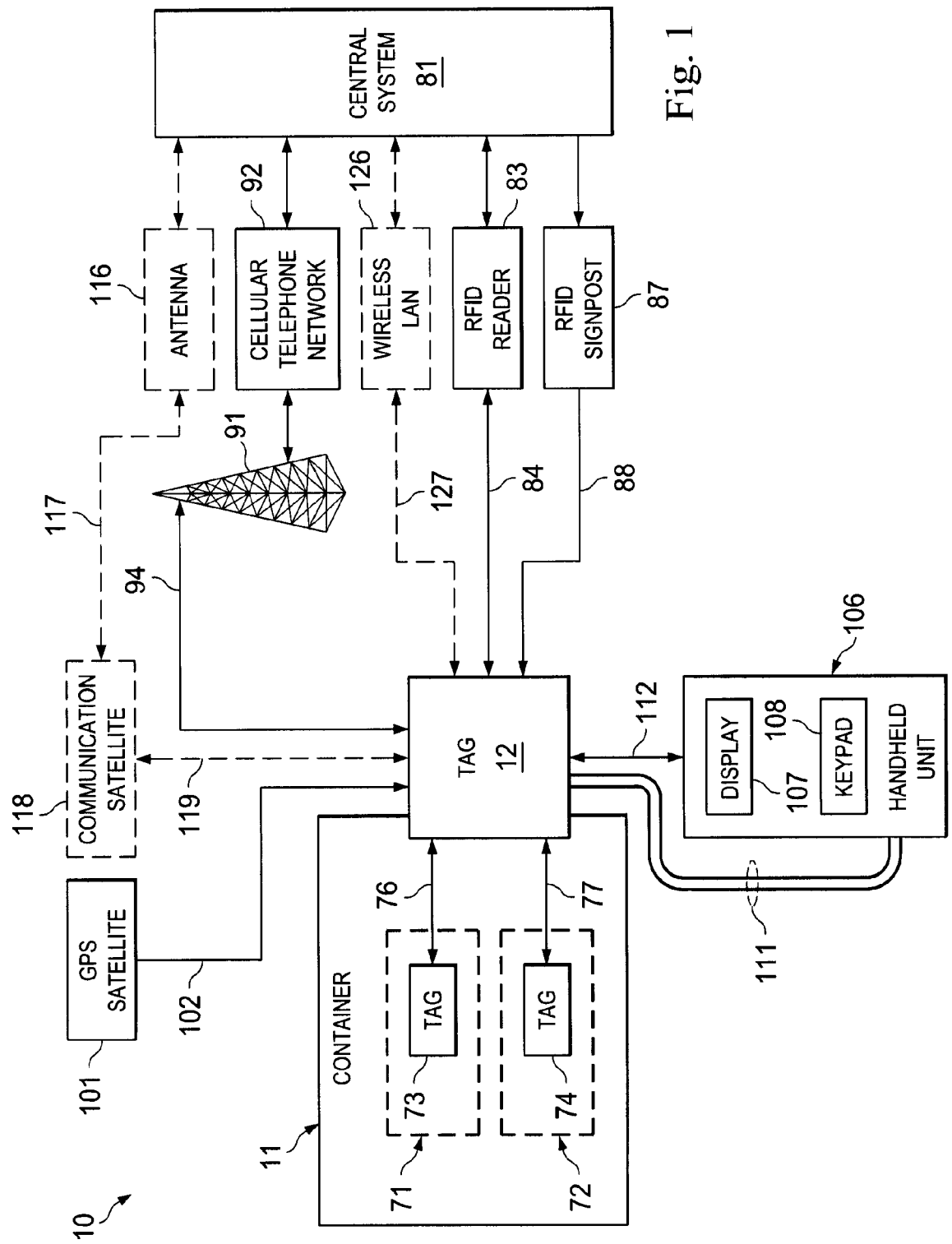
FIG. 1 is a diagrammatic view of a tracking and monitoring system that embodies aspects of the present invention.
Figure 2:
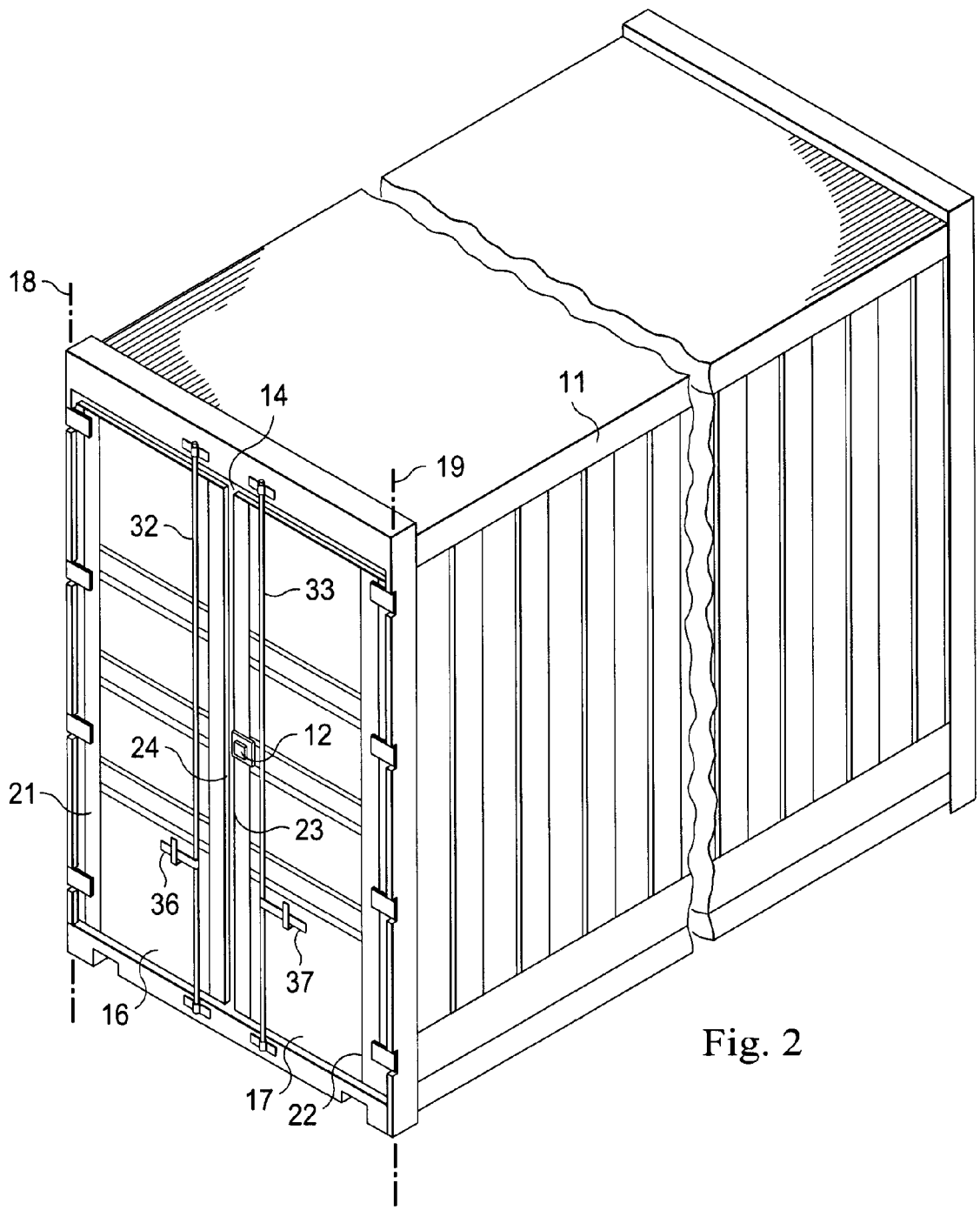
FIG. 2 is a diagrammatic perspective view of a shipping container and a radio frequency identification tag that are components of the system of FIG. 1.

FIG. 1 is a diagrammatic view of a tracking and monitoring system 10 that embodies aspects of the present invention. The system 10 includes a container 11 having a tag 12 supported thereon. FIG. 2 is a diagrammatic perspective view of the container 11 and tag 12. The container 11 is a conventional shipping container of a well-known type, and in particular happens to comply with an industry-standard specification known as an ISO 668:1995(E) Series 1 freight container. The majority of containers that are currently in commercial use conform to this ISO standard. However, this particular type of container is shown only by way of example. The present invention is not limited to this particular type of container, or to containers in general.

The container 11 is made almost entirely of steel or aluminum, except that a not-illustrated floor within the container may be made of either wood or metal. The container 11 has at one end a large opening 14 with an approximately square shape. Two rectangular doors 16 and 17 are supported by hinges for pivotal movement about respective spaced vertical axes 18 and 19. The axes 18 and 19 are located near respective side edges of the opening 14. The doors 16 and 17 are each shown in a closed position in FIG. 2, and can each pivot 90° to 270° outwardly from the closed position to an open position, which is not shown in the drawings.

The doors 16 and 17 each have a respective vertical outer edge 21 or 22, which is disposed adjacent the associated pivot axis 18 or 19. In addition, the doors 16 and 17 each have a respective vertical inner edge 23 or 24. When the doors 16 and 17 are in the closed position of FIG. 2, the inner edges 23 and 24 are adjacent, with a small gap between them. In order to secure the doors 16 and 17 in their closed positions, the door 16 has a vertical rod 32 rotatably supported thereon, and the door 17 has a vertical rod 33 rotatably supported thereon. Each of the rods 32 and 33 has a respective handle 36 or 37 thereon. The handles 36 and 37 can be used to manually rotate the rods 32 and 33 between locked and released positions. In the locked position, each handle can engage a retention bracket mounted on the associated door, and the bracket maintains the handle and rod in the locked position. As each rod is pivoted between its locked and released positions, each end of the rod can move into or out of engagement with a locking bracket or locking recess provided on the container 11.

When the container 11 has been packed with items or products that are to be shipped, various considerations come into play. As a first example, there are situations in which it is desirable to be able to monitor environmental conditions within the container. For example, products such as fresh fruit may keep better if environmental conditions within the container 11 remain within certain acceptable limits. Thus, it may be desirable to monitor relevant environmental conditions such as temperature or humidity. As a second example, after the doors 16 and 17 have been closed and secured at the point of shipment, it may be desirable to have some form of security and monitoring in order to verify that the doors are not opened again until the container arrives at its destination. For example, while the container is in transit, thieves may attempt to break into the container 11 to steal valuable cargo therein, such as computers or other electronic devices. As a third example, the shipper may wish to have accurate information about the current location of the container as it progresses along its journey from the shipper to the recipient. The tracking and monitoring system 10 of FIG. 1 addresses these types of concerns.

Figure 3:
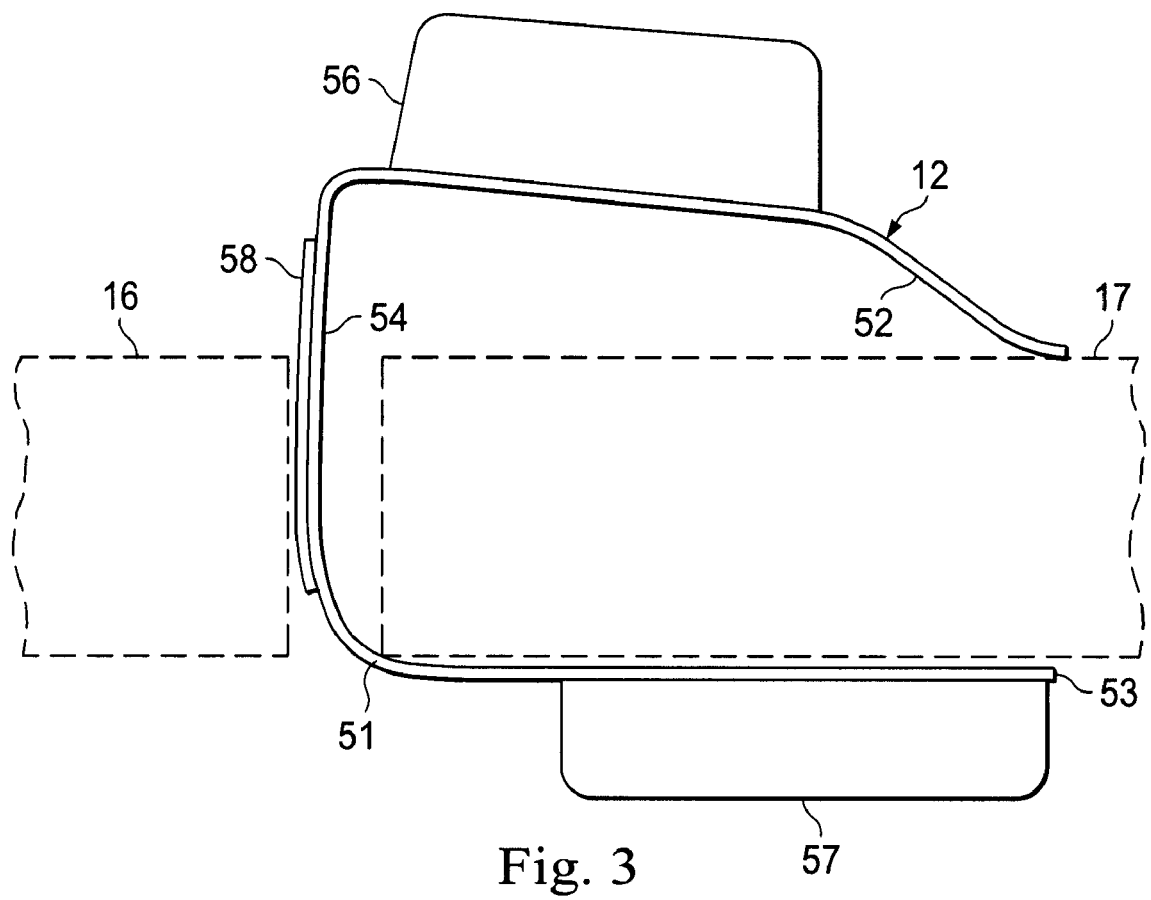
FIG. 3 is diagrammatic top view of the tag of FIG. 2, and also has broken lines showing portions of two doors of the container of FIG. 2.

FIG. 3 is diagrammatic top view of the tag 12 of FIGS. 1 and 2, and also shows portions of the two container doors 16 and 17 in broken lines. The tag 12 includes a resiliently-flexible metal support clip 51. The support clip 51 is approximately C-shaped, and grips around an edge portion of the container door 17, in order to removably support the tag 12 on the door 17. The clip 51 includes two spaced legs 52 and 53, and a bight 54 that extends between the legs, at one end of the legs. An interior module 56 is fixedly secured to the outer side of the leg 52, and an exterior module 57 is fixedly secured to the outer side of the leg 53.

The modules 56 and 57 contain most but not all of the circuitry of the tag 12. The circuitry is discussed in more detail later, but one part of the circuitry is a flat, flexible door sensor 58 that is fixedly secured to the outer side of the bight 54 of the clip 51. In the disclosed embodiment, the door sensor 58 is a capacitive proximity sensor that is responsive to the presence or absence of the metal door 16 within the vicinity of the sensor 58. It is not necessary for the metal door 16 to touch the door sensor 58.

Although the door sensor 58 is a capacitive proximity sensor, it would alternatively be possible to use some other type of sensor, such as a pressure sensor that is engaged by door 16, and actuated by the physical pressure exerted on it by the door 16. The interior module 56, door sensor 58 and exterior module 57 are electrically coupled by a ribbon cable that is not visible in the drawings. The ribbon cable extends along the outer side of the clip 51, from the interior module 56 to the door sensor 58, and then on to the exterior module 57.

Referring again to FIG. 1, when the container 11 is in operational use, it will typically contain a plurality of products or other items that are being shipped, two of which are indicated diagrammatically at 71 and 72. These items may each have a radio frequency identification (RFID) tag 73 or 74 supported thereon. In the disclosed embodiment, the tags 73 and 74 are conventional and commercially-available components, and are therefore not described here in detail. Within the interior of the container 11, the tag 12 can emulate a device of the type commonly known as an RFID reader. In particular, as indicated diagrammatically at 76 and 77, the tag 12 can transmit ultra high frequency (UHF) wireless signals 76 and 77. In the disclosed embodiment, the UHF signals 76 and 77 conform to a conventional RFID communication protocol, but they could alternatively conform to some other protocol. In response to the signals 76 and 77, the tags 73 and 74 can transmit UHF signals 76 and 77 back to the tag 12. In the disclosed embodiment, the UHF transmissions 76 and 77 occur in each direction at a frequency of 433.92 MHz, but they could alternatively occur at some other suitable frequency.

The system 10 includes a computer-based central system 81 that can communicate with the tag 12 in order to facilitate the tracking and monitoring of the container 11. As one aspect of this, the central system 81 is coupled to a stationary RFID reader 83. A typical system might include a plurality of readers 83, but for clarity only one reader 83 is shown in FIG. 1. In the disclosed embodiment, the reader 83 is a conventional device, and is therefore not described here in detail. The reader 83 can transmit and receive UHF wireless signals 84, in order to communicate with a tag 12. These UHF communications are carried out at the above-mentioned frequency of 433.92 MHz, but they could alternatively be carried out at some other suitable frequency. In the disclosed embodiment, the signals 84 conform to an existing RFID communication protocol known as the EchoPoint 2.2 protocol, but they could alternatively conform to some other communication protocol. Signals 84 transmitted from the reader 83 to the tag 12 include a reader identification code that uniquely identifies the particular reader 83.

The system 10 also includes a stationary RFID signpost 87 of a known type, and the signpost 87 is electrically coupled to the central system 81. The signpost 87 transmits wireless signpost signals 88. In the disclosed embodiment, the signpost signals 88 conform to a known RFID communication protocol, and are near field signals with a relatively high roll-off and a relatively short transmission range, for example about four to twelve feet. A typical system would include a plurality of the signposts 87 but, for clarity, only one signpost 87 is shown in FIG. 1.

Each signpost has a unique identification code called a signpost code. The signpost includes that unique signpost code in each of the wireless signals 88 that it transmits. Thus, if the tag 12 is receiving wireless signals 88 from the signpost 87, the signpost code embedded within those signals will uniquely identify the particular signpost that transmitted the signals. This in turn will give a coarse indication of the current location of the tag 12 because, in order to have received signpost signals from a given signpost, the tag must be within a radius of about 12 feet from that signpost. In the disclosed embodiment, the signpost signals 88 are relatively low frequency (LF) signals that have a frequency of 122.88 KHz. However, it would alternatively be possible to use any other suitable frequency.

The tag 12 also has a unique identification code. If the tag 12 sends the central system 81 a communication containing the unique signpost code of the signpost, the unique tag code of the tag, and the unique container identification 156 of the container 11 on which the tag is mounted, then the central system can determine the approximate current location of the container and tag. In particular, the signpost code uniquely identifies the particular signpost, and the central system knows where that signpost is located. Further, as explained above, in order to have received signpost signals from that signpost, the tag and container must have passed within a radius of about 12 feet from that signpost. And the unique tag code and unique container code tell the central system exactly which tag and container passed near the signpost.

The system 10 includes a plurality of cellular telephone towers, one of which is shown diagrammatically at 91. The cell tower 91 is operatively coupled to the central system 81 through a cellular telephone network 92 of a known type. Wireless signals 94 are transmitted in both directions between the tag 12 and the cellular telephone tower 91, using a known cellular telephone network communication protocol. In the disclosed embodiment, the protocol conforms to the General Packet Radio Service (GPRS) communication protocol. The GPRS protocol is a packet-oriented data service available to users of the Global System for Mobile communications (GSM).

The system 10 further includes a Global Positioning System (GPS) satellite 101. The satellite 101 is an existing device. The satellite 101 transmits GPS wireless signals 102 that contain positioning information, and that can be received by the tag 12. There are actually a plurality of the satellites 101 but, for clarity, only one satellite 101 is shown in FIG. 1. The tag 12 can take positioning information in signals received from several GPS satellites 101, and then calculate in a known manner the current position of the tag 12 on the surface of the earth. Alternatively, the tag could take the positioning information received from several GPS satellites, and forward this positioning information to the central system 81, for example through the reader 83. The central system 81 could then carry out the calculation of the current position of the tag 12 on the surface of the earth.

The system 10 further includes a portable handheld unit 106 with a display 107, a manually operable keypad 108, and a cable 111. The cable 111 has at its outer end an electrical connector that can be releasably electrically coupled to a connector on the tag 12. In addition, the tag 12 and the handheld unit 106 can exchange wireless signals, as indicated diagrammatically at 112. In the disclosed embodiment, the wireless signals 112 are UHF signals at the above-mentioned frequency of 433.92 MHz, but they could alternatively use any other suitable frequency.

The system 10 could optionally have an antenna 116 that is coupled to the central system 81, in order to permit the central system 81 to exchange wireless signals 117 with a communication satellite 118. In turn, the communication satellite 118 could exchange wireless signals 119 with the tag 12. The antenna 116, satellite 118 and wireless signals 117 and 119 are shown in broken lines in FIG. 1, because they are optional. In the disclosed embodiment, the wireless signals 117 and 119 conform to a known satellite communication protocol, which is one of the family of protocols commonly known as Satcom protocols. However, it would alternatively be possible for the wireless signals 117 and 119 to conform to some other communication protocol. The communication path provided by the antenna 116 and satellite 118 could be used in place of some other illustrated communication path. For example, the communication path provided by the antenna 116 and satellite 118 could be used in place of the communication path provided by the cellular telephone network 92 and cell tower 91, or the UHF communication path provided by the RFID reader 83.

The system 10 could also optionally include a wireless local area network (LAN) 126, where the LAN is electrically coupled to the central system 81, and can communicate with the tag 12 through the transmission and reception of wireless signals 127. In the disclosed embodiment, the wireless signals 127 conform to a known wireless computer network communication protocol, which is the IEEE 802.11g communication protocol. However, it would alternatively be possible to use any other suitable wireless computer network communication protocol. Wireless LAN's and communication protocols of this type are often referred to as "Wi-Fi". The LAN 126 is shown in broken lines in FIG. 1, because it is optional. The communication path provided by the LAN 126 could be used in place of some other illustrated communication path. For example, the communication path provided by the LAN 126 could be used in place of the communication path provided by the cellular telephone network 92 and cell tower 91, or the UHF communication path provided by the RFID reader 83.

Figure 4:
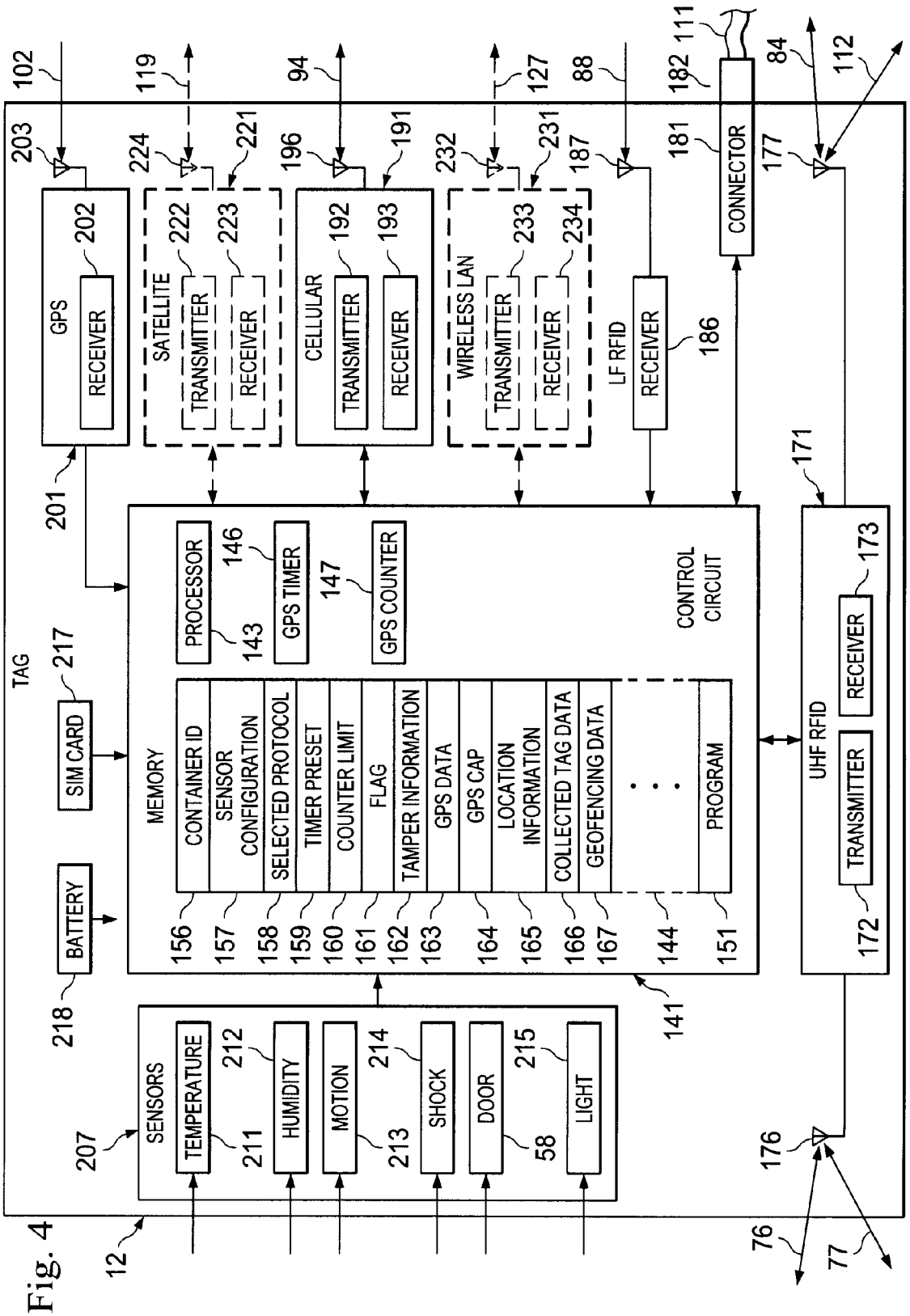
FIG. 4 is a block diagram of the circuitry within the tag of FIG. 2.

FIG. 4 is a block diagram showing in more detail the internal circuitry of the tag 12. This circuitry includes a control circuit 141, and the control circuit includes a processor 143, a memory 144, a GPS timer 146, and a GPS counter 147. The processor 143 is a microprocessor of a known type, and is therefore not described here in detail. The GPS timer 146 and the GPS counter 147 are shown in FIG. 4 as hardware registers. Alternatively, however, one or both of the timer and counter could be locations in the memory 144 that are maintained by a software program executed by the processor 143. In the disclosed embodiment, the memory 144 is a diagrammatic representation of the relevant storage within the control circuit 141, and may include more than one type of memory. For example, the memory 144 may include one or more of read only memory (ROM), random access memory (RAM), flash memory, or any other suitable type of memory.

FIG. 4 diagrammatically shows some of the different types of information stored within the memory 144. In particular, the memory stores a computer program 151 that is executed by the processor 143, and that is discussed in more detail later. The program 151 may be referred to herein as firmware. The memory also stores a container identification 156, which is a code that uniquely identifies the particular container 11 (FIG. 1) on which the tag 12 is currently mounted. The memory contains sensor configuration information 157, which is explained in more detail later. The memory stores an indication of a selected protocol 158. When the tag 12 needs to transmit data, the selected protocol 158 indicates whether the tag should first try to transmit that information as wireless signals 94 conforming to the GPRS cellular telephone network communication protocol, or as UHF wireless signals 84 conforming to the RFID communication protocol.

The memory 144 stores a preset 159 for the timer 146, and a limit value 160 for the counter 147. The memory stores a flag 161 that indicates whether or not the tag is currently operating in a particular operational mode, as explained later. The memory 144 also stores tamper information 162. In particular, if the tag 12 determines that someone is trying to tamper with the tag 12 and/or the container 11, the tag collects data regarding this activity and stores it in a log that is maintained within the memory at 162.

The memory 144 stores GPS data at 163. In this regard, each time the tag 12 calculates a "GPS fix" (by determining its current physical location using GPS positioning information from GPS satellite signals), the result is saved at 163 with other similar GPS data. The data saved for each GPS fix includes a time stamp specifying the time and date that the GPS fix was obtained. The memory 144 stores a GPS cap 164, which is a limit value explained in more detail later. The memory 144 also stores location information 165. This information is supplied to the tag 12 by the central system 81 (FIG. 1), and provides a relatively rough indication of the current location of the tag 12 on the surface of the earth.

For example, with reference to FIG. 1, if the tag 12 happens to be communicating with the central system 81 through the cell tower 91, then the central system 81 knows that the tag is within the area or "cell" serviced by that particular cell tower. Consequently, the central system 81 has a rough idea of the current location of the tag 12. Similarly, if the central system 81 is currently communicating with the tag 12 through the RFID reader 83, the central system 81 knows that the tag is within the communication range of the reader, and thus has a relatively rough idea of the current location of the tag 12. In either situation, to the extent the central system 81 has a relatively rough idea of the current location of the tag 12, the central system can transmit this coarse location information to the tag, for example through the cell tower 91 or through the reader 83. The tag 12 saves this information at 165. Then, when the tag needs to calculate its precise current position from GPS satellite signals, the location information 165 can give the tag 12 a rough initial idea of its current location, and that in turn permits the tag to more rapidly calculate a highly accurate GPS fix indicating its current location on the surface of the earth.

As discussed above in association with FIG. 1, the tag 12 can interrogate other tags 73 and 74 that are located within the container 11, and thus collect information from those other tags. The tag 12 takes this information collected from other tags, and stores it in a section 166 of the memory 144. The memory 144 also stores some geofencing data at 167. The geofencing data 167 may, for example, identify portions of the surface of the earth that correspond to oceans, and portions that correspond to land. Thus, when the tag obtains a GPS fix indicating where the tag is currently located on the surface of the earth, the tag can determine from comparing the GPS fix and the geofencing data whether the tag is currently on land or at sea. The geofencing data could be configured so that the tag can also make other determinations, such as the particular country that the tag is currently in. Further, the tag can use geofencing to determine whether it is currently near an international border, and thus whether it may be subject to a customs inspection.

The tag 12 includes a UHF transceiver 171 that is coupled to the control circuit 141, and the transceiver includes a transmitter 172 and a receiver 173. The control circuit 141 can selectively turn the transmitter 172 and the receiver 173 on and off, in order to reduce overall power consumption. As discussed above, the transmitter 172 and the receiver 173 each operate at 433.92 MHz. The transceiver 171 is coupled to two antennas 176 and 177. The antenna 176 is located in the interior module 56 (FIG. 3), and is used to communicate at 76 and 77 (FIG. 1) with other tags 73 and 74 in the container. The antenna 177 is located in the exterior module 57 (FIG. 3), and is used to communicate at 84 with the reader 83, and at 112 with the handheld unit 106.

The tag 12 has an electrical connector 181 that is part of the exterior module 57 (FIG. 3), that is electrically coupled to the control circuit 141, and that can be accessed from externally of the tag. The cable 111 (FIG. 1) of the handheld unit 106 has at its outer end a connector 182 that can be releasably coupled to the connector 181.

The tag 12 includes a low-frequency (LF) RFID receiver 186 that is coupled to the control circuit 141, and to an antenna 187. The antenna 187 is located in the exterior module 57 (FIG. 3) of the tag. The wireless signals 88 (FIG. 1) from the signpost 87 are received by the tag 12 through the antenna 187 and the receiver 186. The receiver 186 operates at a frequency of 122.88 KHz. The control circuit 141 can selectively turn the LF receiver 186 on and off, in order to manage power consumption.

The tag 12 includes a cellular transceiver 191 that is coupled to the control circuit 141, and that includes a transmitter 192 and a receiver 193. The transceiver 191 is coupled to an antenna 196, and the antenna 196 is located in the exterior module 57 (FIG. 3). The tag 12 uses the transceiver 191 and the antenna 196 to send and receive GPRS wireless signals 94 to and from the cell tower 91 (FIG. 1). The control circuit 141 can selectively and independently turn the transmitter 192 and receiver 193 on and off, in order to reduce power consumption.

The tag 12 has a GPS circuit 201 that is coupled to the control circuit 141, and that includes a receiver 202. The GPS circuit 201 is coupled to an antenna 203, and the antenna 203 is located in the exterior module 57 (FIG. 3). The GPS signals 102 from the GPS satellite 101 (FIG. 1) are received by the tag 12 through the antenna 203 and the receiver 202. The control circuit 141 can selectively turn the receiver 202 on and off, in order to manage power consumption.

The tag 12 includes a sensor section 207 having several outputs that are each electrically coupled to a respective input of the control circuit 141. The sensor section 207 includes several sensors, one of which is the door sensor 58 that has already been discussed above in association with FIG. 3. The other sensors include a temperature sensor 211, a humidity sensor 212, a motion sensor 213, a shock sensor 214, and a light sensor 215.

The temperature sensor 211, the humidity sensor 212, and the light sensor 215 are all provided in the interior module 56 (FIG. 3). The housing of the interior module 56 has openings (or other some other appropriate structure) that gives these sensors access to the temperature, humidity and light conditions within the interior of the container. In the disclosed embodiment, the motion sensor 213 and shock sensor 214 are also provided within the interior module 56. However, they could alternatively be provided elsewhere, for example in the exterior module 57. The light sensor 215 detects the presence or absence of light within the interior of the container 11. If the container doors are closed and locked, then the interior of the container should be dark, and the detection of light within the container may suggest a break-in, or some other form of tampering.

As explained earlier, the memory 144 stores sensor configuration information 157. This configuration information includes an indication of whether each of the sensors in the sensor section 207 is currently enabled or disabled, or in other words whether the control circuit 141 should currently accept or discard data from that sensor. For example, if the container 11 is loaded with fruit, the temperature within the container is likely important, and thus the temperature sensor 211 will probably be enabled. In contrast, if the container 11 is loaded with lumber, temperature may not be an issue, and the temperature sensor 211 may therefore be disabled.

The sensor configuration information 157 also includes thresholds for some or all of the sensors. For example, if the container 11 is loaded with fruit, the temperature within the container should preferably not be allowed to get too high or too low. A high temperature may cause the fruit to ripen too rapidly and thus spoil, whereas a low temperature may injure the fruit by causing it to freeze. Consequently, the sensor configuration information 157 may include an upper limit value and a lower limit value for the temperature sensor 211. If the actual temperature detected by the temperature sensor 211 goes above the upper limit or below the lower limit, the control circuit 141 would designate this condition as an environmental event that justifies the transmission of a wireless signal containing an alarm.

The sensor configuration information 157 could also optionally include other configuration information relating to the sensors 207. As one example, the sensor configuration information could specify that the door sensor 58 can trigger a tamper event by itself, or alternatively that the door sensor 58 and the light sensor 215 must both detect a problem in order to trigger a tamper event.

The tag 12 includes a removable Subscriber Identity Module (SIM) card 217 that is electrically coupled to the control circuit 141. The SIM card is a component of a known type that is commonly used in existing cellular telephones. Within the tag 12, the SIM card 217 facilitates communication between the tag 12 and the cellular network 92 (FIG. 1). For example, the SIM card stores network specific information used to authenticate and identify the tag to the cellular telephone network 92. The SIM card also stores other information of a known type that facilitates communication between the tag and the cellular telephone network. The cellular service plan for the SIM card 217 is configured to include global roaming capability.

The SIM card 217 is located in the interior module 56 (FIG. 3). When the container doors are closed and locked, a person outside the container does not have access to the interior module 56, thereby making it difficult for any such person to remove and/or replace the SIM card (which would be a form of tampering that could interfere with the intended operation of the tag 12). In fact, for enhanced security in the disclosed embodiment, the interior module 56 is not configured to permit field replacement of the SIM card 217. In order to replace the SIM card, the interior module 56 needs to be disassembled in a manner that corresponds to a service procedure requiring the skill level of a factory technician. This is intended to make it even more difficult for a person to tamper with the tag 12 by removing and/or replacing the SIM card 217.

The tag 12 includes a battery 218 that provides operating power to all of the electrical components within the tag 12. In the disclosed embodiment, the battery 218 is a replaceable lithium battery that is a commercially-available part. However, it would alternatively be possible to use any of a variety of other commercially-available batteries.

The tag 12 may optionally include a satellite transceiver circuit 221 that is electrically coupled to the control circuit 141 and also to an antenna 224. The transceiver 221 includes a transmitter 222 and a receiver 223. The transceiver 221 and the antenna 224 are shown in broken lines in FIG. 4, because they are optional. The tag 12 uses the transceiver 221 and the antenna 224 to communicate via the wireless signals 119 with the communication satellite 118 (FIG. 1), for example according to a Satcom protocol. The control circuit 141 can selectively and independently turn each of the transmitter 222 and receiver 223 on and off, in order to manage power consumption.

The tag 12 may also optionally include a wireless LAN transceiver 231 that is electrically coupled to the control circuit 141, and to an antenna 232. The transceiver 231 includes a transmitter 233 and a receiver 234. Since the transceiver 231 and the antenna 232 are optional, they are shown in broken lines in FIG. 4. The tag 12 can use the transceiver 231 and the antenna 232 to communicate via the wireless signals 127 with the wireless LAN 126 (FIG. 1). The control circuit 141 can selectively and independently turn the transmitter 233 and receiver 234 on and off, in order to manage power consumption within the tag 12.

The tag 12 could include each of the satellite transceiver 221, the cellular telephone transceiver 191, the wireless LAN transceiver 231 and the UHF transceiver 171. However, for reasons for practicality and economy, the tag 12 of FIG. 4 includes only a subset of these transceivers. In particular, the tag 12 includes the cellular telephone transceiver 191 and the UHF transceiver 171. Alternatively, however, the tag 12 could include some other subset of the transceivers 221, 191, 231 and 171.

In addition to or in place of the UHF transceiver 171 and the antenna 177, the tag 12 could have not-illustrated passive or semi-passive circuitry of a type known in the art. In response to an incoming UHF signal 84, the passive or semi-passive circuitry would use a portion of the energy of that signal to provide itself with operating power. Remaining energy from the signal would be reflected or re-transmitted, and the passive or semi-passive circuitry would modulate that reflected or retransmitted energy so as to add information, such as the unique identification code of the tag 12.

Figure 5:
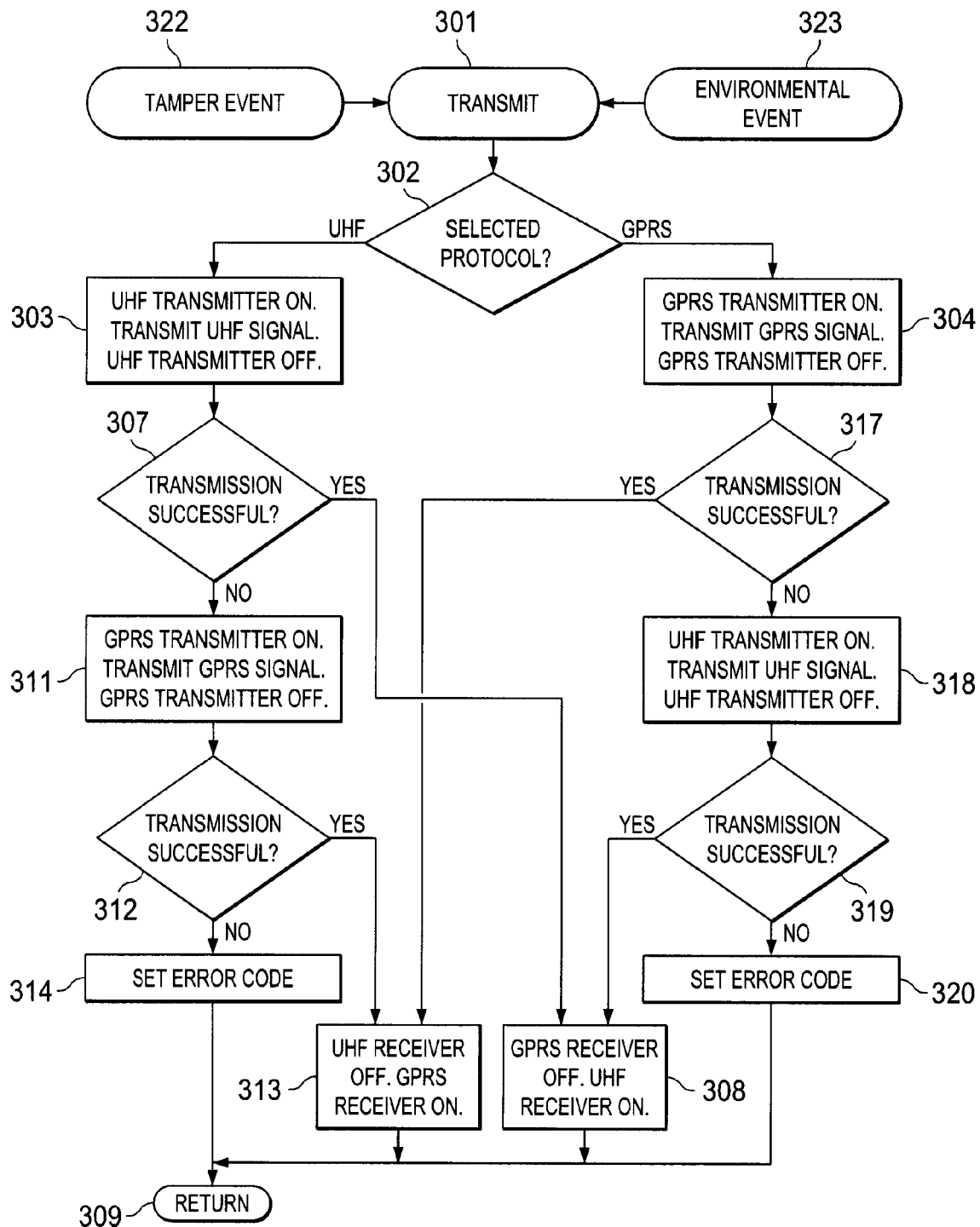
Figure 7B:
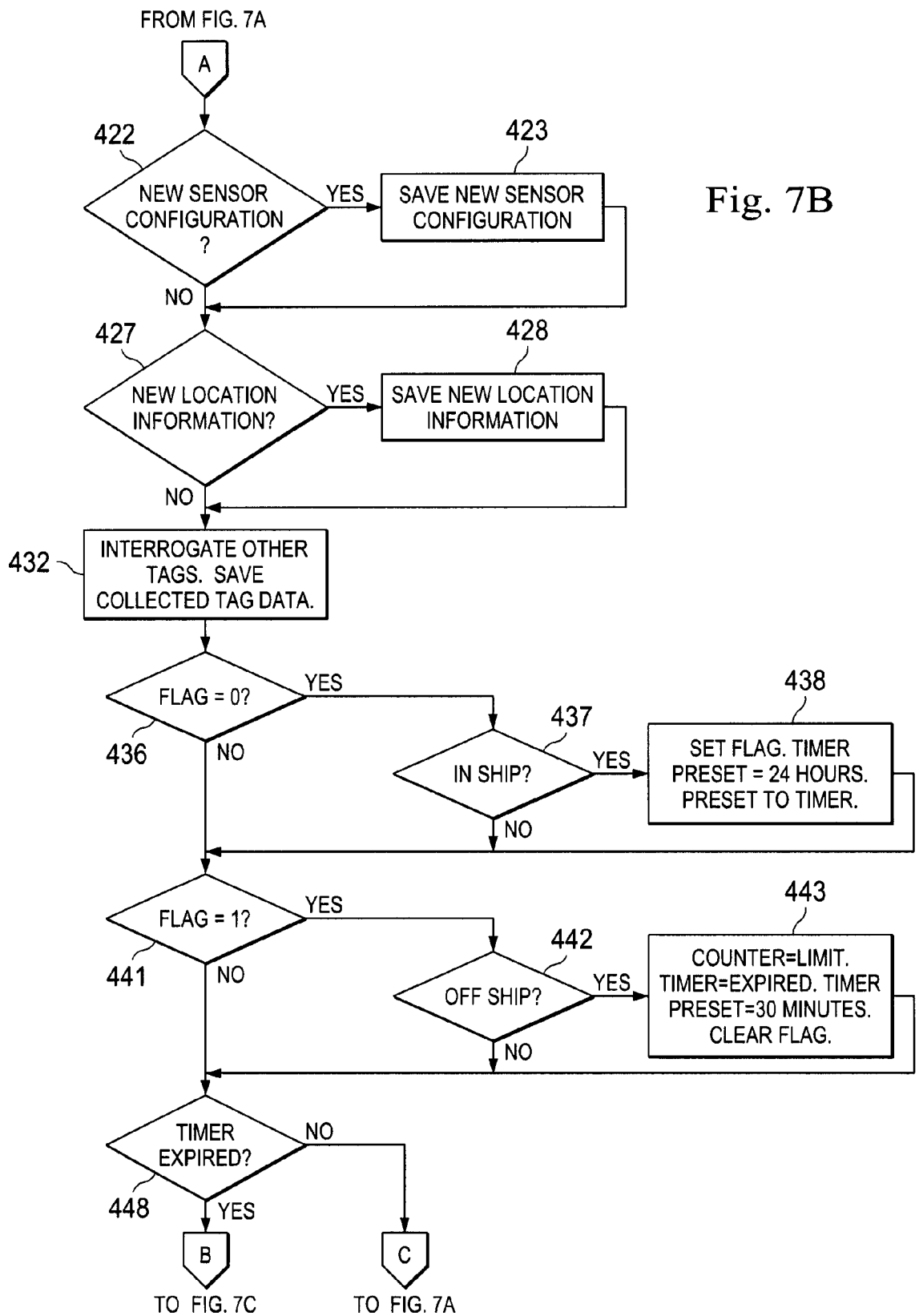
Figure 7C:
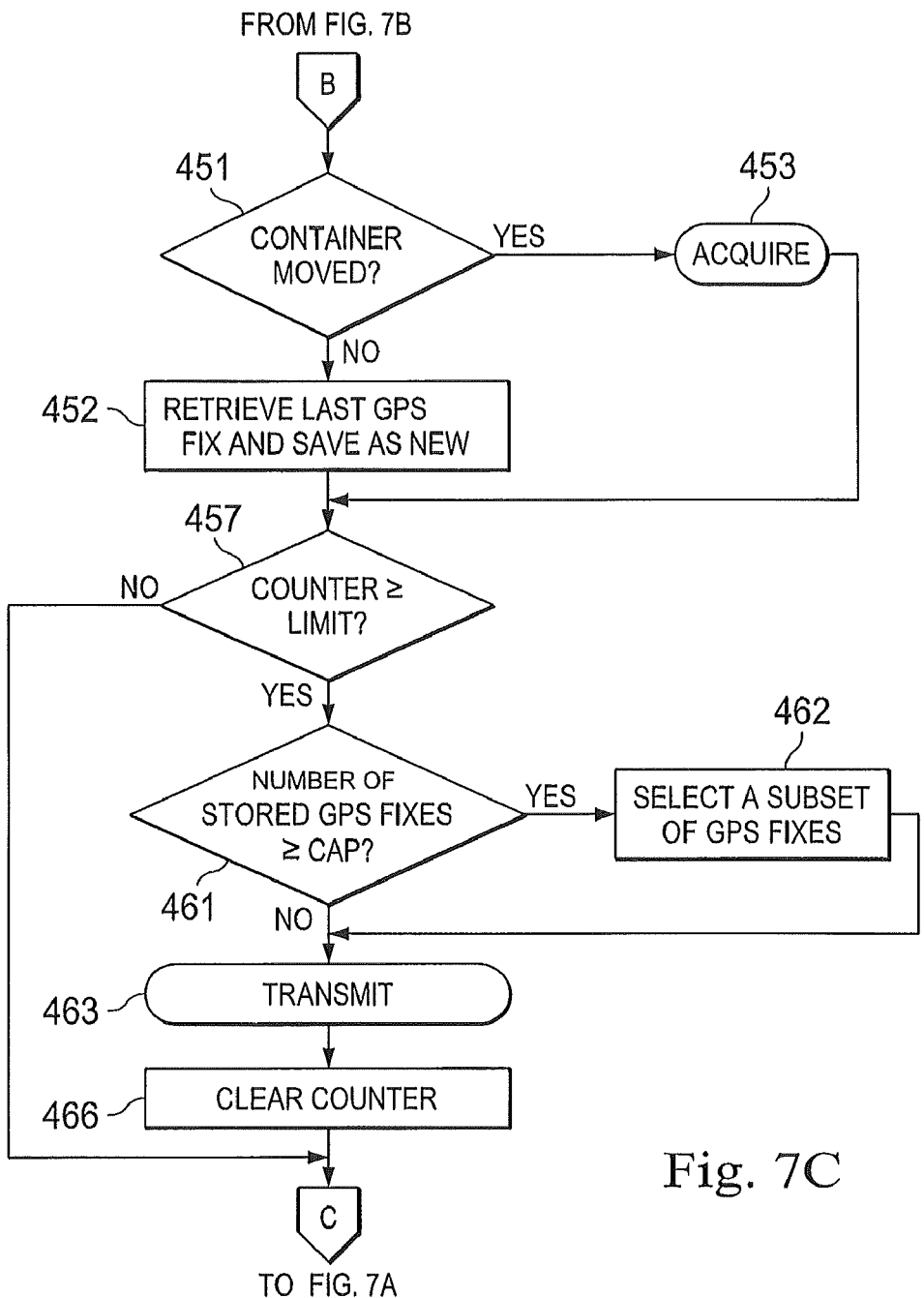

FIGS. 5, 6 and 7 are flowcharts that show selected aspects of the operation of the tag 12 under control of the software program 151 that is executed by the processor 143 (FIG. 4). For simplicity and clarity, these flowcharts do not show all of the activity of the tag 12, but instead depict only selected aspects of the tag's activity that facilitate an understanding of the present invention. Moreover, for simplicity and clarity, the flowcharts assume that optional components discussed above are omitted from the system 10, including the communications satellite 118 and wireless LAN 126 of FIG. 1, and also the satellite transceiver 221, antenna 224, wireless LAN transceiver 231 and antenna 232 of FIG. 4.

With reference to FIGS. 1, 4 and 5, the flowchart of FIG. 5 shows a transmit subroutine that is used by the tag 12 to transmit data to the central system 81, through either the UHF link involving the RFID reader 83, or through the GPRS link utilizing the cell tower 91 and the cellular telephone network 92. The subroutine is entered at block 301, and control then proceeds to block 302, where the tag checks the indication of selected protocols stored at 158 in the memory 144. As explained earlier, the selected protocol 158 indicates whether the tag should first try to transmit data through the UHF link or the GPRS link. If the selected protocol is UHF, then control proceeds to block 303. Alternatively, if the selected protocol is GPRS, then control proceeds to block 304.

In block 303, the tag turns on the UHF transmitter 172, transmits a UHF signal through the transceiver 171 and antenna 177, and then turns off the UHF transmitter 172. Control then proceeds to block 307, where the tag determines whether the transmission was successful. If it was successful, then control proceeds to block 308, where the tag turns off the GPRS cellular receiver 193, and turns on the UHF receiver 173 (if it was not already on). In other words, since the tag has just successfully transmitted information via the UHF link, the tag assumes that it can also successfully receive information through that same link. Consequently, the tag ensures that the UHF receiver is on so it is ready to receive information through the UHF link, and turns the GPRS cellular receiver off in order to reduce power consumption. From block 308, control proceeds to block 309, where control is returned to the routine that called the subroutine of FIG. 5.

Referring again to block 307, assume that the tag has just tried transmit information via the UHF link, but the transmission was not successful. Control then proceeds from block 307 to block 311. In block 311, the tag turns on the GPRS cellular transmitter 192, transmits a GPRS signal containing the same information that the tag unsuccessfully tried to transmit in block 303, and then turns off the GPRS cellular transmitter. Control then proceeds to block 312, where the tag evaluates whether the transmission was successful. If the transmission was successful, then the tag proceeds to block 313, where it turns off the UHF receiver 173, and turns on the GPRS receiver 193 (if it was not already on). In other words, since the tag has just successfully transmitted information via the GPRS link, the tag assumes that it can also successfully receive information through that same link. Consequently, the tag ensures that the GPRS receiver is on so it is ready to receive information through the GPRS link, and turns the UHF receiver off in order to reduce power consumption. Control then proceeds to block 309, for an exit from the subroutine.

Referring to the block 312, if the tag determines that the attempts to transmit via the UHF and GPRS links were both unsuccessful, then control then proceeds to block 314, where the tag sets an error code, and then to block 309 where control is returned to the calling routine, along with the error code.

Referring back to blocks 302 and 304, assume that the selected protocol identified at 158 is GPRS, such that control proceeds from block 302 to block 304. In block 304, the tag turns on the GPRS cellular transmitter, transmits a GPRS signal, and then turns off the GPRS cellular transmitter. Control then proceeds to block 317, where the tag evaluates whether the GPRS transmission was successful. If so, then control proceeds from block 317 to block 313, which has already been described. Otherwise, control proceeds to block 318, where the tag turns on the UHF transmitter, transmits a UHF signal, and then turns off the UHF transmitter. Control then proceeds to block 319, where the tag evaluates whether the UHF transmission was successful. If so, then control proceeds from block 319 to block 308, which has already been described. Otherwise, control proceeds from block 319 to block 320, where the tag sets an error code. Control then proceeds to block 309, where control is returned to the calling routine, along with the error code.

If the door sensor 58 detects that a container door is open at a point in time when the tag 12 believes that the container doors should both be closed and locked, then tampering may be occurring, and the tag 12 flags it as tamper event that merits immediate transmission of some form of alarm to the central system 81. Similarly, if the temperature sensor 211 is enabled and the tag determines that the detected temperature in the container 11 is above an upper threshold or below a lower threshold, the tag flags it as an environmental event that merits immediate transmission of some form of alarm to the central system 81. FIG. 5 shows that if there is a tamper event 322, then the transmit subroutine is promptly entered at 301 in order to transmit an alarm to the central system 81. Similarly, if there is an environmental event 323, then the transmit routine is promptly entered at 301 in order to transmit an alarm to the central system 81.

In the flowchart of FIG. 5, if a GPRS transmission is not successful, the tag attempts to instead make a UHF transmission. Alternatively, however, since GPRS is one form of GSM, if a GPRS transmission is not successful, then it would be possible to attempt some other form of GSM transmission before attempting a UHF transmission.

For simplicity and clarity, the discussion of the flowchart of FIG. 5 has assumed that, whether data is sent in a UHF communication or in a GPRS communication, the transmitted data is the same. Alternatively, however, it would be possible for the data in a GPRS communication to differ in some respects from the data in a counterpart UHF communication. In this regard, for example, a UHF communication may need to conform to an existing RFID communication protocol, and that protocol may define and/or limit what data can be included in the UHF communication. In contrast, a GPRS communication would not have comparable restrictions regarding what data can be transmitted. Thus, it would be possible for a GPRS communication to include all of the data that would be transmitted in a counterpart UHF communication, and also some additional data. Consequently, a GPRS communication from the tag to the central system 81 could include all of the following: (1) the unique identification code of the tag sending the communication, (2) a data element representing the tag model number, hardware revision and firmware version, (3) the unique container identification 156 (FIG. 4), (4) the latitude and longitude for each of one or more GPS fixes from the GPS data 163, and a time stamp for each such GPS fix, (5) status information indicating whether there has been an alarm event or a tamper event, whether the tag is currently locked, and the current state of the battery, (6) an indication for each of the sensors 58 and 211-215 as to whether or not that sensor is currently enabled and, if so, the current output value from that sensor, and (7) an error detection and correction code.

The flowchart of FIG. 6 shows a subroutine used by the tag 12 to carry out acquisition of a "GPS fix". Before discussing the flowchart of FIG. 6 in detail, it will be helpful to briefly discuss the GPS timer 146 and GPS counter 147 (FIG. 4). The GPS timer 146 determines the time interval that elapses from the acquisition of one GPS fix to the start of an acquisition for the next GPS fix. Stated differently, the timer 145 is started when acquisition of a GPS fix is completed, and the next GPS acquisition is started when the timer expires. The duration of the timer is determined by the timer preset stored at 159 in the memory 144. The GPS counter 147 determines how many GPS fixes the tag 12 accumulates before attempting to report those accumulated GPS fixes to the central system 81. After an accumulation of several GPS fixes has been transmitted to the central system 81, the GPS counter 147 is cleared. Then, the counter is incremented each time the tag successfully acquires a new GPS fix. When the value in the counter reaches the counter limit value stored at 160 in the memory 144, the tag transmits the accumulated GPS fixes to the central system 81, and then clears the counter 147 again.

Turning now in more detail to FIG. 6, and with reference to FIGS. 1 and 4, the subroutine of FIG. 6 is entered from a calling routine at block 341. Control proceeds to block 342, where the tag turns on the GPS receiver 202, and retrieves from the memory 144 the location information 165. As discussed earlier, tag receives the location information 165 from the central system 81, and the location information provides the tag with a coarse indication of the tag's current location. This coarse indication of the tag's location gives the tag a rough starting point for a GPS calculation, thereby permitting the tag to more rapidly calculate a GPS fix that accurately indicates the tag's current location. In block 342, the tag then initiates the GPS acquisition process, using the location information as a starting point. The tag then clears the location information 165 in the memory. In this regard, if the container 11 and tag 12 are moving, the location information 165 would become progressively more stale over time. Thus, although the location information is useful in obtaining an initial GPS fix, when obtaining each subsequent GPS fix, the tag can start from the most recent prior GPS fix, and that prior GPS fix will likely be more accurate than the location information 165 from an earlier point in time.

From block 342, control proceeds to blocks 343 and 344. Blocks 343 and 344 represent a loop where the acquisition routine waits for the acquisition process to yield a GPS fix. In block 343, the tag checks to see whether a GPS fix has been obtained. If not, the tag proceeds to block 344, where the tag checks to see whether, during the GPS acquisition process, it has received an RFID signal in the form of either a UHF signal 84 or a LF signal 88. Receipt of an RFID signal will establish at least a rough indication of the tag's current location (in the manner discussed earlier). Therefore, since use of the GPS receiver 202 imposes a significant current drain on the battery 218, receipt of an RFID signal intentionally results in termination of the GPS acquisition process, so that the GPS receiver 202 can be turned off in order to conserve power. The current location of the tag is determined from the RFID communication rather than from a GPS fix.

In more detail, if the tag determines in block 344 that it has not just received a UHF or LF signal, then control returns to block 343. In essence, the tag waits in the loop defined by blocks 343 and 344 for the first of either (1) the determination of a GPS fix, or (2) the receipt of an RFID signal.

If no RFID signal is received during the GPS acquisition process, then when the tag ultimately determines a GPS fix, control proceeds from block 343 to block 347. In block 347, the tag saves the new GPS fix in the GPS data section 163 of the memory 144. At any given point in time, the GPS data section 163 of the memory 144 will typically contain data from a plurality of successive GPS fixes. Thereafter, still in block 347, the tag turns off the GPS receiver 202, and increments the count of GPS fixes in the GPS counter 147. Control then proceeds to block 348, where the tag restarts the GPS timer 146, in particular by loading the timer preset 159 into the timer 146. The tag then proceeds from block 348 to block 349, where control is returned to the calling routine.

Referring back to the loop defined by blocks 343 and 344, assume that an RFID signal is received during the GPS acquisition process, before the acquisition process yields a GPS fix. The receipt of the RFID signal will cause control to proceed from block 344 to block 353, where the tag will terminate the GPS acquisition process, and turn off the GPS receiver 202. Control will then proceed to block 354, where the tag calls the transmit routine of FIG. 5, in order to transmit a message to the control system 81. If the RFID signal was a signpost signal 88 from the signpost 87, then the message sent to the central system 81 will include the unique signpost code from that signpost signal. Alternatively, if the RFID signal was a signal 84 from the reader 83, then the message sent to the central system 81 will include the unique reader code from that signal 84. In either case, the signpost code or reader code will give the central system information about the current location of the tag 12, because the central system knows which signpost or reader the tag is currently near. Control then proceeds from block 354 to block 348, which has already been described.

Before explaining the flowchart of FIG. 7 in detail, it will be helpful to briefly summarize the sequence of events that would be encountered by the tag 12 as the associated container 11 is transported on a hypothetical journey from a shipping facility to a destination facility. Before the tag 12 is mounted on a container, it may sit in inventory for several weeks at the shipping facility. During this time period, the tag 12 is in a deep sleep state, in which all nonessential circuitry within the tag is turned off to conserve battery power. As part of this, the UHF transceiver 171 is off, the GPS receiver 202 is off, the cellular transceiver 191 is off, and the LF receiver 186 is off. As explained above, it is assumed for the sake of this discussion that the optional satellite transceiver 221 and wireless LAN transceiver 231 are not present, but if they were present, they would also be off.

At some point, the container 11 is loaded with items that are to be shipped, such as the items shown at 71 and 72 in FIG. 1. The tag 12 will then be mounted on a door of the container, and then the container doors will be closed and physically locked. The cable 111 of the handheld unit 106 is then coupled to the tag, and the handheld unit is used to commission the tag 12. Commissioning of the tag includes waking the tag from its deep sleep state, and then providing the tag with some initialization information. After this, the tag will be electronically locked, which means that the tag begins actively performing its tracking and monitoring functions. The locked state of the tag is also sometimes referred to as a "sealed" state. After the tag has been electronically locked, the cable 111 of the handheld unit 106 is disconnected from the tag.

For the purpose of this hypothetical example, it is assumed that the container 11 is to be transported on a non-illustrated truck from the shipping facility to a seaport, then transferred from the truck to a not-illustrated ship for transportation from that seaport to a different seaport, and then transferred from the ship to a different truck for transportation to a destination facility. At the destination facility, the tag is decommissioned and removed, and the container is then unloaded. When the container is at the shipping facility, at either seaport, or at the destination facility, there will likely be RFID systems that each include one or more readers of the type shown at 83, and one or more signposts of the type shown at 87. At each of these locations, there will also likely be a nearby cellular telephone tower similar to the tower 91 (FIG. 1), in order to provide telephone service. In addition, at each of these locations, the tag should be exposed to GPS signals from multiple GPS satellites that are each similar to the GPS satellite shown at 101 in FIG. 1.

During the first and third segments of the journey, when the container 11 is traveling by truck, the tag 12 will typically not be within any local RFID system having a reader 83 and/or a signpost 87. But the tag will likely pass a series of cell towers 91 during part or all of each of these segments of the journey (except in some countries where GSM and GPRS service is not widely available). Thus, during part or all of these segments of the journey, the tag will be able to communicate with the central system 81 through a cellular telephone network such as that shown at 92 in FIG. 1. Further, throughout the first and third segments of the journey, the tag 12 will likely receive GPS signals 102 from multiple GPS satellites.

During the second segment of the journey, the container 11 will be on a ship. A ship typically does not have any RFID system and, while out on the ocean, is typically not within the range of any RFID system or any cellular telephone tower. Therefore, while the ship is between ports, the tag 12 will normally be outside the range of both RFID communications and cellular communications.

During the second segment of the journey, the tag 12 and the container 11 will typically be in the hold of a ship having a hull that is made primarily of metal. Further, the container 11 will probably be somewhere in a stack of containers that are all made of metal, and that stack of containers will probably be between stacks of other containers that are also made of metal. Consequently, the metal of the ship and the metal of the other containers will collectively act as electromagnetic shielding that tends to prevent the tag 12 from receiving wireless signals of any type, including RFID communications, cellular telephone communications, wireless computer network signals, and satellite signals. At best, if the container 11 happens to be near the top of its stack of containers, the tag 12 might possibly be able to receive some GPS or other satellite signals, but this will be the rare exception rather than the rule. Consequently, the second segment of the journey (by ship) represents a significant opportunity for conserving battery power. In particular, while the container 11 is traveling by ship, the tag 12 can keep most of its transceivers off in order to conserve battery power, and also can attempt GPS acquisitions on a more infrequent basis in order to conserve battery power.

If the route of the container happens to cross an international border, then the container 11 may be subject to a customs inspection. In particular, a customs inspector may electronically unlock the tag 12 (for example with a special handheld unit similar to that shown at 106 in FIG. 1). The inspector would then open the container 11, perform the customs inspection, close the container 11, and then again electronically lock the tag 12. Unlocking of the tag 12 should result in suspension of GPS and GPRS activity. Locking of the tag should result in resumption of those activities.

Turning now in detail to FIG. 7, block 401 represents the above-mentioned deep sleep state of the tag 12, while the tag is sitting on a shelf, and before it is mounted on the container 11 and then commissioned. In the disclosed embodiment, the transceivers and receivers of the tag are all off in the deep sleep state, in order to conserve battery power. This includes the GPS receiver 201, the GPRS cellular transceiver 191, the UHF transceiver 171, and the LF receiver 186. At block 402, the processor 143 checks to see whether the handheld unit 106 has its cable 111 coupled to the tag 12, and if so, whether the handheld unit is telling the tag to wake from its deep sleep state. It should be noted that the disclosed embodiment is specifically configured so that, to wake the tag 12 from its deep sleep state, a human operator must manually couple the cable 111 to the tag 12, and then manually press keys on the keypad 108. This helps the tag conserve battery power, by allowing the tag to keep of all of its transceivers and receivers off, and by avoiding the need for the tag to periodically turn on at least one receiver in order to check for the presence of any wireless signal telling it to wake from its deep sleep state. However, it would alternatively be possible to configure the tag to periodically turn on a selected one of the receivers 173, 186, 234, 193 and 223 in order to check for wireless signals that will cause the tag to leave its deep sleep state and go through the commissioning process.

After the container 11 is loaded with cargo, the tag 12 is mounted on the container door, and the container doors are closed and locked, the handheld unit 106 is used to commission the tag 12. The commissioning process begins with an instruction to the tag 12 to wake from its deep sleep state. When the tag receives this instruction through the cable 111, control will proceed from block 402 to block 403.

In block 403, the tag 12 accepts and stores some initialization information from the handheld unit 106. More specifically, the tag is provided with the unique container ID for the specific container 11 on which the tag has been mounted, and stores this container identification at 156 in the memory 144. The tag is also provided with sensor configuration information for the sensors 207, and stores the configuration information at 157. The tag is given a selected protocol, or in other words an indication of whether UHF communication or GPRS communication should be given preference when it is necessary to transmit information to the central system 81. This selected protocol is stored at 158. The tag is also provided with location information, and stores it at 165. For example, at this point in time, the tag 12 will typically be in a shipping facility, and the central system 81 will know the location of the shipping facility. The central system 81 can therefore give the tag 12 location information that will make it easier for the tag 12 to obtain its first GPS fix.

The tag also initializes certain portions of its memory. In particular, the tag clears the flag 161, the tamper information 162, the GPS data 163, and the collected tag data 166. The tag initializes the timer preset 159 to a time interval of 30 minutes, initializes the counter limit 160 to a value of 5, and initializes the GPS cap 164 to a value of 5. The tag then loads the GPS timer 146 with the timer preset 159 in order to start the timer, and clears the GPS counter 147 in order to initialize the counter. Then, the tag is electronically locked, which essentially means that it begins actively monitoring and tracking the container 11.

From block 403, control proceeds to block 407. As soon as the tag has been commissioned and becomes active, its first responsibility is to acquire and transmit the first GPS fix of its journey. Accordingly, block 407 makes a call to the GPS acquisition subroutine of FIG. 6, where the tag acquires a GPS fix. Control then proceeds to block 408, where the tag makes a call to the transmit subroutine of FIG. 5, in order to transmit this first GPS fix to the central system 81.

Control then proceeds to block 411, where the tag checks to see whether it is currently locked. In general, the tag should remain locked throughout the entire journey from the shipping facility to the destination facility. However, if this journey happens to cross an international border, then as discussed above, the tag may be unlocked to permit a customs inspection, and then locked again at the end of the inspection. Thus, in block 411, the tag is essentially checking to see whether it is still locked, or in other words whether it has been temporarily unlocked for a customs inspection. As part of this evaluation, the tag could optionally use geofencing to determine whether it is currently in the vicinity of an international border, where a customs inspection would be likely. If the tag determines that it has been unlocked, it proceeds to block 412, where it loads the timer preset 159 into the GPS timer 146 in order to restart the timer, and clears the GPS counter 147. The tag waits in blocks 411 and 412 until the customs inspection is completed and the tag is electronically locked again. The tag then proceeds from block 411 to block 416.

In block 416, the tag checks to see whether it has received an indication that it is being decommissioned. This should only occur when the container 11 has reached the destination facility at the end of its journey, and when the tag is being decommissioned so that it can be removed from the container and put back on the shelf. If the tag is being decommissioned, then control proceeds from block 416 to block 417. As the tag is being decommissioned, it is expected to acquire a final GPS fix and transmit that fix to the central system 81. Accordingly, in block 417, a call is made to the GPS acquisition subroutine of FIG. 6, and then control proceeds to block 418. In block 418, a call is made to the transmit subroutine of FIG. 5, in order to transmit that final GPS fix to the central system 81. Control then proceeds to block 419, where the tag is unlocked, and then to block 401, where the tag returns to its deep sleep state.

Referring again to block 416, during the entire journey of the container, the tag should normally find that it is not being decommissioned, and should therefore proceed from block 416 to block 422. At block 422, the tag checks to see whether it has just received a communication from the central system 81 with updated sensor configuration information. If so, control proceeds to block 423, where the tag saves this new sensor configuration information at 157 in the memory 144.

From block 423, or if was determined in block 422 that no new sensor information was received, control proceeds to block 427. In block 427, the tag checks to see whether it has just received from the central system 81 a communication that contains new location information. If so, then at block 428 the tag saves this new location information at 165 in the memory 144. In this regard, during the journey of the container, the central system 81 may occasionally provide the tag 12 with updated location information that will assist in obtaining a GPS fix, particularly if the tag has been traveling under circumstances where it has not been able to obtain a GPS fix for a period of time. For example, during the second segment of the hypothetical journey outlined above, when the container and tag are in the hold of a ship, the tag will probably not be able to receive any GPS signals. Accordingly, when the container and tag are removed from the hold of the ship, it will help the tag more quickly acquire its first GPS fix in the second seaport if the tag has up-to-date location information.

From block 428, or if was determined in block 427 that no new sensor information was received, control proceeds to block 432. In block 432, the tag uses its UHF transceiver 171 and its antenna 176 to interrogate other tags present within the container 11, such as the two tags shown at 73 and 74 in FIG. 1. The tag 12 then takes the information that it collected from these other tags, and stores this collected tag data at 166 in the memory 144.

Control then proceeds from block 432 to block 436. As explained earlier, the memory 144 contains a flag 161. During the first and third segments of the hypothetical journey outlined above, while the container 11 is on a truck, the flag 161 is a binary "0". In contrast, during the second segment of that journey, while the container is on a ship, the flag 161 is a binary "1". In block 436, the tag 12 checks to see whether the flag is a zero. If so, then the tag believes it is not currently on a ship, and control proceeds to block 437. In block 437, the tag checks to see whether it is currently being loaded onto a ship.

In this regard, the container 11 will typically be loaded into and removed from a ship by a type of device commonly known as a quay crane, and this type of crane creates certain motion and shock events that can be detected by the motion sensor 213 and the shock sensor 214. Moreover, if the GPS receiver 202 is not currently receiving a GPS carrier signal, that may indicate that the container 11 has been moved into the hold of the ship, where the metal ship and other metal containers provide electromagnetic shielding that prevent the GPS carrier signal from reaching the tag 12. And if other receivers such as the GPRS cellular receiver 193, the LF receiver 186 and the UHF receiver 173 are also not receiving any signals, that constitutes a further indication that the container 11 and the tag 12 may be in the hold of the ship, or in some other similar situation. Accordingly, by evaluating one or more of the sensors, and/or other conditions, the tag can usually determine that it is beginning the second segment of its journey (by ship).

When the tag determines that it has been loaded onto a ship (or placed in some other comparable situation), the tag proceeds from block 437 to block 438, where it sets the flag in memory location 161, increases the timer preset 159 to 24 hours, and restarts the GPS timer 146 by loading it with this new preset. Thus, while the tag and container are on the ship, the tag will conserve power by taking GPS fixes significantly less frequently than when the container and tag were traveling by truck, thereby conserving battery power. From block 438, control proceeds to block 441. Similarly, if it is determined in block 436 that the flag is zero, or if it is determined in block 437 that the container 11 has not just been placed in a ship or similar situation, control proceeds to block 441.

In block 441, the tag checks to see if the flag is set. If so, then the tag believes it has been on a ship (or in a similar situation), and control proceeds to block 442. In block 442, the tag checks to see whether it is currently being removed from a ship. The tag can make this determination by evaluating one or more of the same types of considerations that were used in block 437 to determine if the tag was being loaded into a ship. If the tag determines in block 442 that it is being removed from a ship, then control proceeds to block 443.

As discussed earlier, if the tag is receiving GPS signals, the tag can use the geofencing data 167 to determine whether it is currently on land or at sea. Thus, if the tag is not on a ship, a geofencing analysis will confirm this. Alternatively, if the tag is on a ship and happens to be in a situation where it can receive GPS signals, a geofencing analysis will tell the tag that it is at sea, and thus each of blocks 437 and 442 can be based on geofencing analysis.

In block 443, the tag takes the counter limit value from memory location 160, and loads it into the counter 147. Further, the tag changes the timer preset 159 back to 30 minutes, and forces the timer 146 to an expired state. The changes to the counter and the timer will force the tag to immediately take a GPS fix, as discussed below. This is important because, if the tag has been in the hull of a ship for several days and has not been able to communicate in any way with the central system 81, the tag needs to promptly determine where it is, and then report this information to the central system 81. From block 443, control proceeds to block 448. Alternatively, if it was determined in block 441 that the flag was not set, or if it was determined in block 442 that the container was not being removed from a ship, control would proceed to block 448.

In block 448, the tag checks to see whether the GPS timer 146 is expired. As explained earlier, if the timer is expired, it means that the tag should take a GPS fix. Therefore, if the timer has not expired, control proceeds from block 448 back to block 411. Otherwise, if the timer is expired, control proceeds from block 448 to block 451.

In block 451, the tag checks to see whether the container has moved since the tag took its most recent GPS fix. For example, the motion sensor 213 and shock sensor 214 are relatively sensitive, and if they are not detecting any motion or shock, then the container is probably not moving. And if the container has not moved since the last GPS fix, then the tag is presented with a power-saving opportunity. In particular, rather than turn on the GPS receiver 202 and expend the battery power needed to obtain a new GPS fix, the container instead proceeds to block 452, where it retrieves the most recent prior GPS fix from the GPS data 163, and stores this prior GPS fix in the GPS data 163 as a new GPS fix with a new time stamp. On the other hand, if it is determined at block 451 that the container has moved since the last GPS fix, then control proceeds to block 453, where a call is made to the GPS acquisition routine of FIG. 6, so that the tag acquires a new GPS fix and saves it in the GPS data 163. From either of blocks 452 and 453, control then proceeds to block 457.

In block 457, the tag checks to see whether the GPS counter 147 has reached the upper limit value specified by the counter limit 160. As discussed above, the GPS counter 147 determines how many GPS fixes the tag 12 will accumulate before attempting to report those accumulated GPS fixes to the central system 81. If the counter has reached the counter limit, then the tag has collected the required number of GPS fixes, and should transmit all of them to the central system 81. Therefore, in block 457, if the GPS counter 147 has not yet reached the limit specified by the counter limit 160, control returns from block 457 back to block 411. Otherwise, control proceeds to block 461, where the tag checks the GPS data 163 in memory 144, in order to see whether the number of GPS fixes stored there is greater than an upper limit specified by the GPS cap 164.

For example, if the container 11 has been on a segment on its journey where it is on a truck and the tag has been taking regular GPS fixes, but the tag has not been able to transmit the GPS fixes to the central system 81, the tag may have accumulated a large number of GPS fixes. Transmitting all of those GPS fixes to the central system 81 would provide the central system with more information than it needs, and may also incur an unnecessarily large charge for use of a cellular telephone network. According, if the number of stored GPS fixes is too large, control proceeds from block 461 to block 462, where the tag selects a subset of the stored GPS fixes. For example, if the GPS data 163 happens to contain 100 GPS fixes, the tag might select fixes 1, 25, 50, 75 and 100 for transmission to the central system 81 (in chronological order). However, the subset of GPS fixes could alternatively be selected in any other suitable manner. From block 462, control proceeds to block 463, where a call is made to the transmit subroutine of FIG. 5, in order to transmit the selected subset of GPS fixes to the central system 81.

On the other hand, if it is determined in block 461 that the number of stored GPS fixes is less than the number specified by the GPS cap 164, then control proceeds directly from block 461 to block 463, where the tag transmits all of the stored GPS data to the central system. From block 463, control proceeds to block 466, where the tag clears the GPS counter 147, so that the counter can again begin the process of counting newly acquired GPS fixes, in order to determine when the tag has accumulated enough GPS fixes to justify transmitting GPS information to the central system 81. From block 466, control returns to block 411.

Although a selected embodiment has been illustrated and described in detail, it should be understood that a variety of substitutions and alterations are possible without departing from the spirit and scope of the present invention, as defined by the claims that follow.

What is claimed is:

1. An apparatus comprising a tag having circuitry comprising:
    a reader portion integral to said tag, said reader portion functioning as a reader capable of wireless communication with other tags; and
    a communications portion configured to perform wireless communications, wherein:
        the tag includes an approximately C-shaped clip having two spaced legs and a bight extending between said legs; and
        the reader and communication portions each include an antenna, one of the antennas being supported on one of the legs of the clip, and the other of the antennas being supported on the other of the legs of the clip.

2. An apparatus according to claim 1, wherein the communications portion is configured to perform said wireless communication with other tags using wireless signals that are ultra high frequency (UHF) wireless signals conforming to a radio frequency identification communication protocol.

3. An apparatus according to claim 1, wherein the wireless communications comprise one of a radio frequency identification communication protocol, a cellular telephone network communication protocol, a satellite communication protocol, and a wireless computer network communication protocol.

4. A system comprising:
    a radio frequency identification (RFID) tag comprising circuitry, the circuitry operating in a first operational mode and a second operational mode, wherein the circuitry consumes less power in the second operational mode than in the first operational mode; and
    a handheld unit configured to be coupled to the RFID tag, the handheld unit configured to provide instructions to the circuitry to exit the second operational mode, wherein
        the circuitry only exits the second operational mode in response to a human using the handheld unit.

5. The system according to claim 4, wherein the handheld unit includes a manually operable interface, and is releasably electrically coupled by a cable to said circuitry in said tag.

6. The system according to claim 4, wherein the handheld unit includes a manually operable interface, and that is capable of wireless communication with said circuitry in said tag, said act by a human including manual operation of said manually operable interface.

7. A method of operating a radio frequency identification (RFID) tag that includes circuitry having first and second operational modes, said circuitry consuming substantially less power in said second operational mode than in said first operational mode, said method comprising:
    entering, at a handheld unit configured to be coupled to the RFID tag, manual instructions entered by a human at a manually operable interface of the handheld unit to exit the second operational mode;
    receiving, at the RFID tag, the manual instructions causing said circuitry to exit said second operational mode; and
    exiting, by the circuitry of the RFID tag, the second operational mode, wherein the RFID tag only exits the second operational mode in response to receiving the manual instruction entered by a human at the handheld unit.

8. The method according to claim 7,
    wherein the handheld unit is releasably electrically coupled by a cable to said circuitry in said tag.

9. The method according to claim 7,
    wherein the handheld unit is capable of wireless communication with said circuitry in said tag.

10. An apparatus comprising a tag having circuitry that includes a communications portion configured to receive wireless communications conforming to one of a cellular telephone network communication protocol, a satellite communication protocol, and a wireless computer network communication protocol, said circuitry responding to receipt of a predetermined wireless signal that conforms to said one of said protocols by the communications portion by carrying out one of:
    a first action that includes causing the tag to enter an electronically locked state; and
    a second action that includes causing the tag to exit said electronically locked state, wherein:
    the predetermined wireless signal includes a container identification; and
    the first action includes extracting the container identification from the received wireless signal, and saving the container identification.

11. An apparatus according to claim 10,
    wherein said circuitry has first and second operational modes, said circuitry consuming substantially less power in said second operational mode than in said first operational mode; and
    wherein said first action includes causing said circuitry to exit said second operational mode.

12. An apparatus according to claim 10,
    wherein said circuitry has first and second operational modes, said circuitry consuming substantially less power in said second operational mode than in said first operational mode; and
    wherein said second action includes causing said circuitry to enter said second operational mode.

13. An apparatus according to claim 10, wherein said wireless communications conform to said cellular telephone network communication protocol, said cellular telephone network communication protocol being the General Packet Radio Service (GPRS) protocol.

14. An apparatus according to claim 10, wherein said wireless communications conform to said satellite communication protocol, said satellite communication protocol being a Satcom communication protocol.

15. A method of operating a tag having circuitry that includes a communications portion configured to receive wireless communications conforming to one of a cellular telephone network communication protocol, a satellite communication protocol, and a wireless computer network communication protocol, said method comprising:
    receiving in said communications portion of said circuitry a predetermined wireless signal conforming to said one of said protocols;
    configuring the predetermined wireless signal to include a container identification; and responding to receipt of said predetermined wireless signal by carrying out one of:
a first action that includes causing the tag to enter an electronically locked state, wherein said first action includes extracting the container identification from the received wireless signal, and saving the container identification; and
a second action that includes causing the tag to exit said electronically locked state.

16. A method according to claim 15,
wherein said circuitry has first and second operational modes, said circuitry consuming substantially less power in said second operational mode than in said first operational mode; and
wherein said first action includes switching said circuitry from said second operational mode to said first operational mode.

17. A method according to claim 15,
wherein said circuitry has first and second operational modes, said circuitry consuming substantially less power in said second operational mode than in said first operational mode; and
wherein said second action includes switching said circuitry from said first operational mode to said second operational mode.

18. A method according to claim 15, including configuring said wireless communications to conform to said cellular telephone network communication protocol, said cellular telephone network communication protocol being the General Packet Radio Service (GPRS) protocol.

19. A method according to claim 15, including configuring said wireless communications to conform to said satellite communication protocol, said satellite communication protocol being a Satcom communication protocol.

* * * * *